US008607976B2

(12) United States Patent
Wu et al.

(10) Patent No.: US 8,607,976 B2
(45) Date of Patent: Dec. 17, 2013

(54) STORING MECHANISM FOR ELECTRONIC DEVICE

(75) Inventors: Chun-Che Wu, Taipei (TW); Chung-Chun Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 41 days.

(21) Appl. No.: 13/416,991

(22) Filed: Mar. 9, 2012

(65) Prior Publication Data
US 2013/0134061 A1 May 30, 2013

(30) Foreign Application Priority Data
Nov. 25, 2011 (TW) .............................. 100143438 A

(51) Int. Cl.
*B65D 85/00* (2006.01)
(52) U.S. Cl.
USPC .......... 206/320; 206/45.24; 248/458
(58) Field of Classification Search
USPC .......... 206/45.26, 305, 320, 45.2, 45.23, 206/45.24; 248/176.1, 458, 918; 361/679.55, 679.56, 679.59; 455/575.1, 575.6, 575.8
See application file for complete search history.

(56) References Cited

U.S. PATENT DOCUMENTS

| 7,281,698 | B2 * | 10/2007 | Patterson, Jr. | 248/458 |
| 8,328,008 | B2 * | 12/2012 | Diebel et al. | 206/320 |
| 2005/0016647 | A1 * | 1/2005 | Carey et al. | 206/320 |
| 2010/0089778 | A1 * | 4/2010 | Park | 206/320 |
| 2010/0122924 | A1 * | 5/2010 | Andrews | 206/320 |
| 2011/0259771 | A1 * | 10/2011 | Johnson | 206/320 |
| 2012/0012483 | A1 * | 1/2012 | Fan | 206/320 |

* cited by examiner

*Primary Examiner* — Luan K Bui
(74) *Attorney, Agent, or Firm* — Kirton McConkie; Evan R. Witt

(57) ABSTRACT

A storing mechanism for an electronic device includes a base member, an upper cover, and a protective cover. The protective cover is used for covering a rear surface of the electronic device. The upper cover includes a first upper covering plate, a second upper covering plate, and a fixing structure. The protective cover includes a connecting ring. Due to engagement between the connecting ring and the fixing structure, the protective cover is fixed on the upper cover. The fixing structure is disposed on the second upper covering plate and arranged at a junction between the first upper covering plate and the second upper covering plate. Consequently, an upper cover angle between the fixing structure and the first upper covering plate is changeable when the second upper covering plate is bent relative to the first upper covering plate.

16 Claims, 13 Drawing Sheets

STORING MECHANISM FOR ELECTRONIC DEVICE

FIELD OF THE INVENTION

The present invention relates to a storing mechanism, and more particularly to a storing mechanism for an electronic device.

BACKGROUND OF THE INVENTION

With increasing development of science and technology, the general trends in designing electronic devices are toward small size, light weightiness and easy portability. Generally, the display screen of the electronic device is a touch screen. Via the touch screen, the user may input commands into the electronic device to control operations of the electronic device. Since the small-sized electronic device can only withstand a relatively lower impact, if the touch screen is damaged, the handling capability of the electronic device is deteriorated. In other words, it is important to protect the electronic device.

As a consequence, a storing mechanism for an electronic device is disclosed. Please refer to FIGS. 1, 2 and 3. FIG. 1 is a schematic exploded view illustrating a conventional storing mechanism for an electronic device. FIG. 2 is a schematic exploded view illustrating the conventional storing mechanism of FIG. 1 in a storing mode. FIG. 3 is a schematic exploded view illustrating the conventional storing mechanism of FIG. 1 in an operating mode. The storing mechanism 1 is used for storing an electronic device 2 therein, so that the electronic device 2 and a display screen 20 of the electronic device 2 are protected by the storing mechanism 1. The electronic device 2 is a tablet computer, and the display screen 20 is a touch screen. As shown in FIGS. 1, 2 and 3, the storing mechanism 1 comprises a protective cover 10 and a supporting base 11. The protective cover 10 is used for enclosing an electronic device 2. In addition, the protective cover 10 has a hollow part 101, a first buckling part 102, an entrance 103, a sealing piece 104, a plurality of first magnetic elements 105, a plurality of second magnetic elements 106, and a plurality of third magnetic elements 107. The supporting base 11 is used for enclosing the protective cover 10 or supporting the protective cover 10 thereon. In addition, the supporting base 11 comprises a plurality of stopping plates 111, a base body 112, a foldable piece 113, a foldable groove 114, a covering plate 115, a second buckling part 116, and a plurality of fourth magnetic elements 117.

The hollow part 101 is formed in a front surface of the protective cover 10. After the electronic device 2 is enclosed by the protective cover 10, the electronic device 2 is exposed outside through the hollow part 101 to be operated by a user (see FIG. 3). The first buckling part 102 is disposed on a rear surface of the protective cover 10. The entrance 103 is located at a first long side of the protective cover 10. Through the entrance 103, the electronic device 2 may be accommodated within the protective cover 10 or removed from the protective cover 10. The sealing piece 104 is located at the first long side of the protective cover 10 for sealing the entrance 103 in order to prevent the electronic device within the protective cover 10 from being detached through the entrance 103. The first magnetic elements 105 are disposed on the first long side of the protective cover 10 and at the locations corresponding to the sealing piece 104. The second magnetic elements 106 are located at an end of the sealing piece 104. When the entrance 103 is sealed by the sealing piece 104, the second magnetic elements 106 and the first magnetic elements 105 are magnetically attracted by each other. Since the second magnetic elements 106 and the first magnetic elements 105 are magnetically attracted by each other, the sealing piece 104 can be securely fixed on the first long side of the protective cover 10. In addition, the third magnetic elements 107 are disposed on the rear surface of the protective cover 10.

In addition, the stopping plates 111 are located at a first side of the base body 112 of the supporting base 11. In addition, every two adjacent stopping plates 111 are separated from each other by a proper spacing interval. The stopping plates 111 are used for stopping a second long side of the protective cover 10, thereby preventing the protective cover 10 from being slid on the base body 112. The foldable piece 113 is located at a second side of the base body 112. In addition, the size of the foldable piece 113 matches the thickness of the electronic device 2. The covering plate 115 is extended from the foldable piece 113. In addition, the covering plate 115 may be combined with the protective cover 10, or the protective cover 10 may be supported by the covering plate 115. The foldable groove 114 is formed in the covering plate 115. Due to the foldable groove 114, the covering plate 115 may be bent at different angles to support the protective cover 10. The second buckling part 116 is disposed on the covering plate 115. Due to the engagement between the second buckling part 116 and the first buckling part 102, the protective cover 10 and the supporting base 11 are combined together. In addition, the second buckling part 116 is rotatable relative to the first buckling part 102. Consequently, the buckling part 116 may be fixed on the supporting base 11 in a horizontal-placement status or an upright-placement status (see FIG. 3). The fourth magnetic elements 117 are disposed on an edge of the base body 112 and at the locations corresponding to the third magnetic elements 107 so as to be magnetically attracted by the third magnetic elements 107. When the fourth magnetic elements 117 and the third magnetic elements 107 are magnetically attracted by each other, the protective cover 10 may be securely fixed on the base body 112.

After the electronic device 2 has been used and needs to be stored, the electronic device 2 is enclosed by the protective cover 10, and then the second buckling part 116 and the first buckling part 102 are engaged with each other. Consequently, the protective cover 10 and the supporting base 11 are combined together, and the protective cover 10 is enclosed by the supporting base 11. Meanwhile, the fourth magnetic elements 117 and the third magnetic elements 107 are magnetically attracted by each other, so that the protective cover 10 is securely fixed on the supporting base 11.

In a case that the user wants to operate the electronic device 2, there are three approaches of operating the storing mechanism 1. In accordance with a first approach, the second buckling part 116 and the first buckling part 102 are disengaged from each other, so that the protective cover 10 is detached from the supporting base 11. Under this circumstance, the electronic device 2 may be directly operated while the protective cover 10 is handheld.

Hereinafter, a second approach of operating the electronic device will be illustrated with reference to FIGS. 3 and 4. FIG. 4 is a schematic side view illustrating the conventional storing mechanism of FIG. 1 in an operating mode and in a horizontal-placement status. In accordance with the second approach, the second buckling part 116 and the first buckling part 102 are still engaged with each other, and the protective cover 10 and the supporting base 11 are combined together. Then, the covering plate 115 is bent at a first angle A1 to support the protective cover 10. In addition, the second long side of the protective cover 10 is stopped by one of the stopping plates 111, thereby preventing the protective cover 10 from being slid on the base body 112. According to the second approach, the protective cover 10 is fixed on the supporting base 11 in a horizontal-placement status. In other words, the storing mechanism 1 in an operating mode and in a horizontal-placement status.

Hereinafter, a third approach of operating the electronic device will be illustrated with reference to FIGS. 3 and 5. FIG. 5 is a schematic side view illustrating the conventional storing mechanism of FIG. 1 in an operating mode and in an upright-placement status. After the electronic device is in the horizontal-placement status, the second buckling part 116 is rotated relative to the first buckling part 102, and the covering plate 115 is bent at a second angle A2 to support the protective cover 10. In addition, a short side of the protective cover 10 is stopped by one of the stopping plates 111, thereby preventing the protective cover 10 from being slid on the base body 112. In other words, the storing mechanism 1 in an operating mode and in an upright-placement status.

According to the second operating approach and the third operating approach, the touch screen 20 of the electronic device 2 is severed as a general display screen. In addition, an external keyboard (not shown) is connected to the electronic device 2. Through the external keyboard, the user may input characters or symbols into the electronic device 2 in order to comply with the usual practice of most users to operate the desktop computer or the notebook computer. Moreover, the external keyboard may be connected to the electronic device 2 through a universal serial bus (USB). Alternatively, the external keyboard may be in communication with the electronic device 2 through a wireless transmission module in a wireless transmission manner.

However, the above storing mechanism still has some drawbacks. In a case that the storing mechanism 1 is switched from the horizontal-placement status to the upright-placement status, the bending angle of the covering plate 115 is switched from the smaller first angle A1 to the larger second angle A2. As the bending angle of the covering plate 115 is increased, the covering plate 115 is in contact with the protective cover 10. Consequently, the engagement between the second buckling part 116 and the first buckling part 102 becomes more instable. Under this circumstance, the second buckling part 116 is readily disengaged from the first buckling part 102, and thus the protective cover 10 is detached from the supporting base 11.

Therefore, there is a need of providing a storing mechanism for an electronic device in order to stably fix the protective cover (or the electronic device) and prevent detachment of the protective cover from the supporting base.

SUMMARY OF THE INVENTION

The present invention provides a storing mechanism for an electronic device in order to achieve both the functions of supporting the electronic device and storing the electronic device.

The present invention also provides a storing mechanism for an electronic device in order to securely fix the electronic device.

In accordance with an aspect of the present invention, there is provided a storing mechanism for an electronic device. The storing mechanism includes a protective cover, a base member, and an upper cover. The protective cover is used for covering a rear surface of the electronic device. The protective cover includes a connecting ring. The upper cover is connected with the base member and rotatable relative to the base member, so that the base member is covered by the upper cover or an included angle is defined between the upper cover and the base member. The upper cover includes a first upper covering plate, a second upper covering plate, and a fixing structure. The first upper covering plate is connected with the base member and rotatable relative to the base member. The second upper covering plate is connected with the first upper covering plate and bendable relative to the first upper covering plate. The fixing structure is used for fixing the connecting ring on the upper cover. The fixing structure is disposed on the second upper covering plate and arranged at a junction between the first upper covering plate and the second upper covering plate. Consequently, an upper cover angle between the fixing structure and the first upper covering plate is changeable when the second upper covering plate is bent relative to the first upper covering plate.

In an embodiment, the fixing structure includes a first fixing ring and a second fixing ring. The first fixing ring is disposed on an upper cover surface of the second upper covering plate, and includes an outer surface, a first outer protrusion piece, and a first recess. The outer surface is disposed on an outer periphery of the first fixing ring. The first outer protrusion piece is disposed on the outer surface. The first recess is located at the outer surface and arranged between the first outer protrusion piece and the upper cover surface. After the connecting ring is inserted into the first recess, the connecting ring and the first fixing ring are engaged with each other. The second fixing ring is disposed on another upper cover surface of the second upper covering plate for fixing the first fixing ring on the second upper covering plate.

In an embodiment, the first outer protrusion piece is located at a first end of the outer surface. A first length of the first fixing ring from the first outer protrusion piece to a second end of the outer surface is greater than a second length of the first fixing ring from a third end of the outer surface to a fourth end of the outer surface. In addition, the first length of the first fixing ring is smaller than a length of the connecting ring, so that the fixing structure is penetrable through the connecting ring.

In an embodiment, the first fixing ring further includes a second outer protrusion piece and a second recess. The second outer protrusion piece is disposed on the outer surface of the fixing structure and located at a second end of the outer surface. The second recess is located at the outer surface and arranged between the second outer protrusion piece and the upper cover surface. After the connecting ring is inserted into the second recess, the connecting ring and the first fixing ring are engaged with each other.

In an embodiment, a first length of the first fixing ring from the first outer protrusion piece to the second outer protrusion piece is greater than a second length of the first fixing ring from a third end of the outer surface to a fourth end of the outer surface, wherein the outer surface has an elliptic contour.

In an embodiment, the connecting ring includes an inner surface and a first inner protrusion piece. The inner surface is disposed on an inner periphery of the connecting ring. The first inner protrusion piece is disposed on the inner surface of the connecting ring. After the first inner protrusion piece is inserted into the first recess, the fixing structure and the first fixing ring are engaged with each other.

In an embodiment, the first inner protrusion piece is located at a first end of the inner surface. A first length of the connecting ring from the first inner protrusion piece to a second end of the inner surface is smaller than a second length of the connecting ring from a third end of the inner surface to a fourth end of the inner surface.

In an embodiment, the connecting ring further includes a second inner protrusion piece. The second inner protrusion piece is disposed on the inner surface of the connecting ring, and located at a second end of the inner surface. After the second inner protrusion piece is inserted into the second recess, the fixing structure and the first fixing ring are engaged with each other.

In an embodiment, a first length of the connecting ring from the first inner protrusion piece to the second inner protrusion piece is smaller than a second length of the connecting ring from a third end of the inner surface to a fourth end of the inner surface, wherein the inner surface has an elliptic contour.

In an embodiment, the protective cover further includes a first opening and a second opening. The first opening is located at a first edge of the protective cover. The second opening is located at a second edge of the protective cover, wherein the base member further comprises a fixing post, and the fixing post is penetrated through the first opening or the second opening, so that the first edge or the second edge of the protective cover is fixed on the base member.

In an embodiment, when the first edge of the protective cover is fixed on the base member, the included angle between the upper cover and the base member is equal to a first angle. When the second edge of the protective cover is fixed on the base member, the included angle between the upper cover and the base member is equal to a second angle, wherein the first angle is smaller than the second angle.

In an embodiment, the base member further includes a foldable structure, which is located at a first side of the base member. After the base member is covered by the upper cover, the foldable structure is folded to cover the upper cover. A first fixing element is disposed within the foldable structure, and a second fixing element is disposed within the upper cover. After the base member is covered by the upper cover, the first fixing element and the second fixing element are coupled with each other.

In an embodiment, the first fixing element is a metallic sheet, and the second fixing element is a magnetic element.

In an embodiment, the first fixing element is a magnetic element, and the second fixing element is a metallic sheet.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
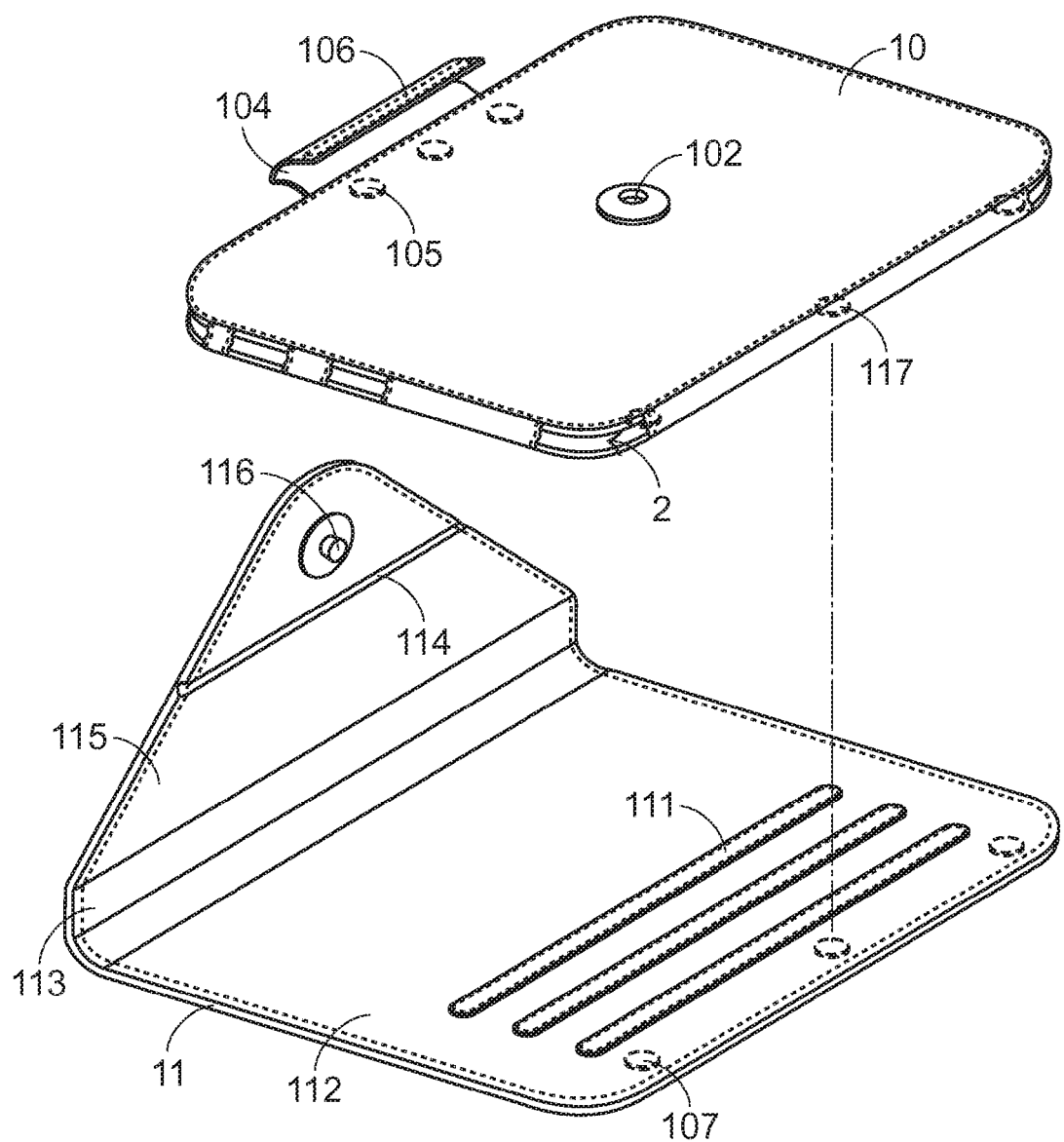
FIG. 1 is a schematic exploded view illustrating a conventional storing mechanism for an electronic device.
Figure 2:
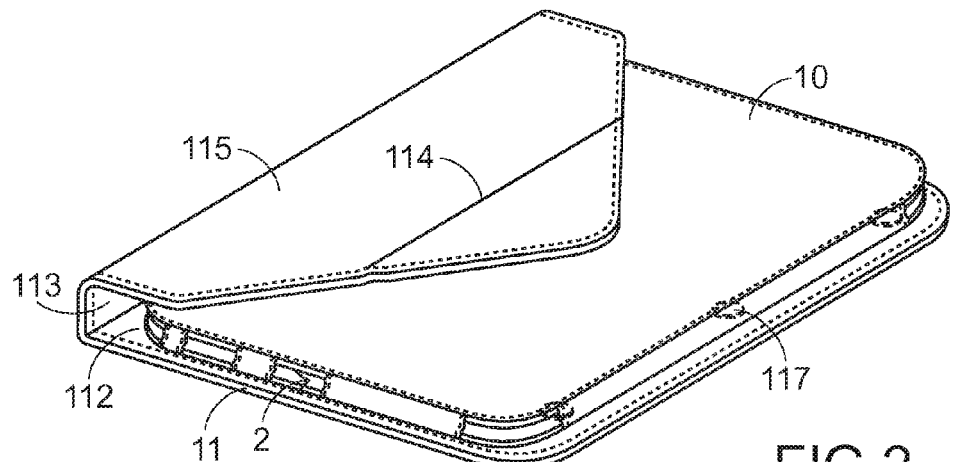
FIG. 2 is a schematic exploded view illustrating the conventional storing mechanism of FIG. 1 in a storing mode.
Figure 3:
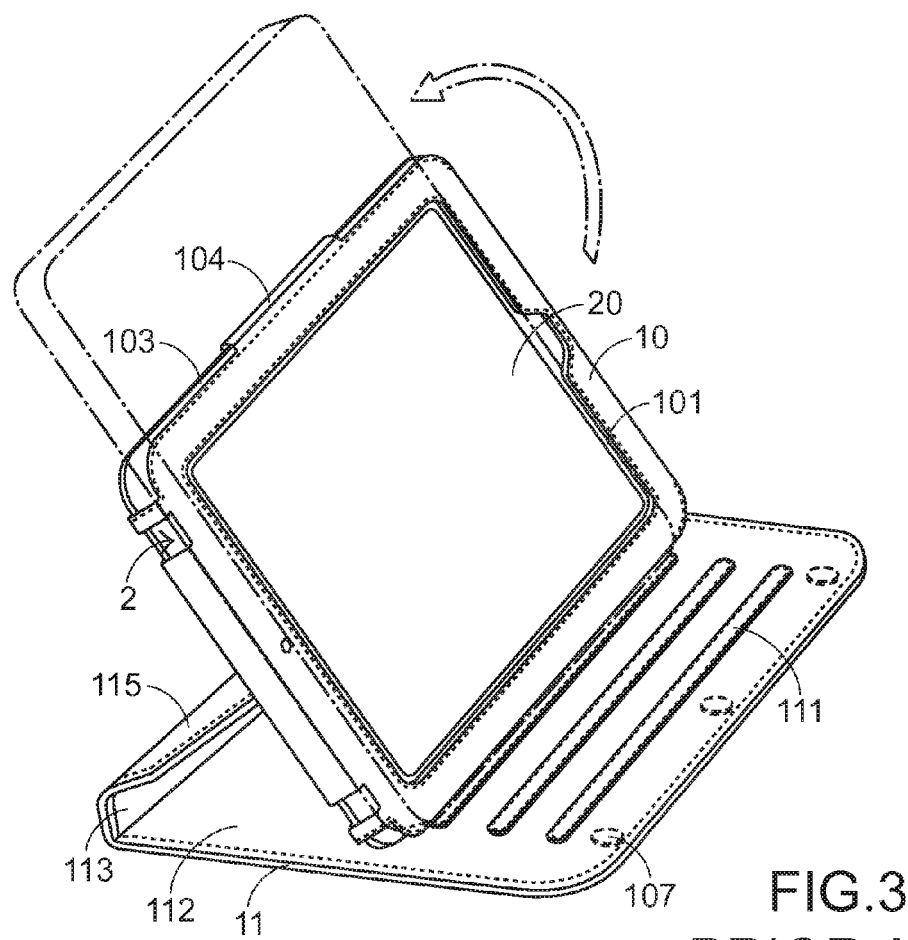
FIG. 3 is a schematic exploded view illustrating the conventional storing mechanism of FIG. 1 in an operating mode.
Figure 4:
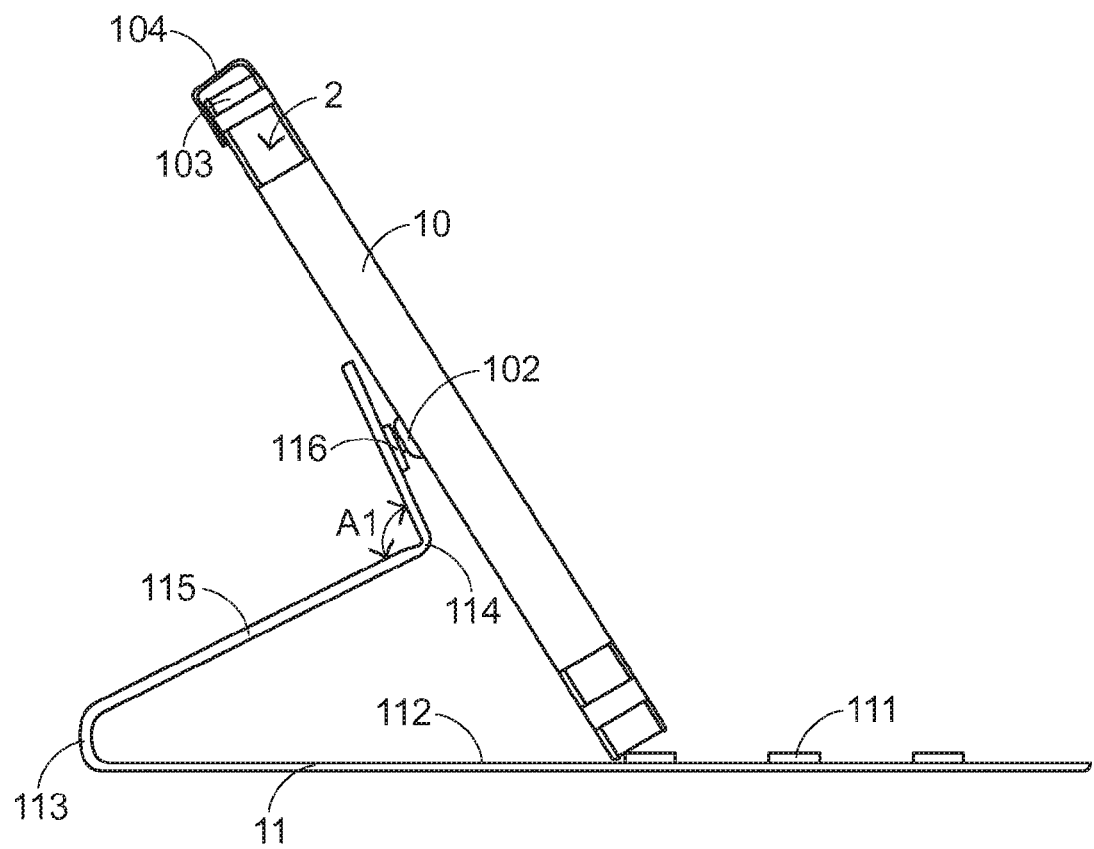
FIG. 4 is a schematic side view illustrating the conventional storing mechanism of FIG. 1 in an operating mode and in a horizontal-placement status.
Figure 5:
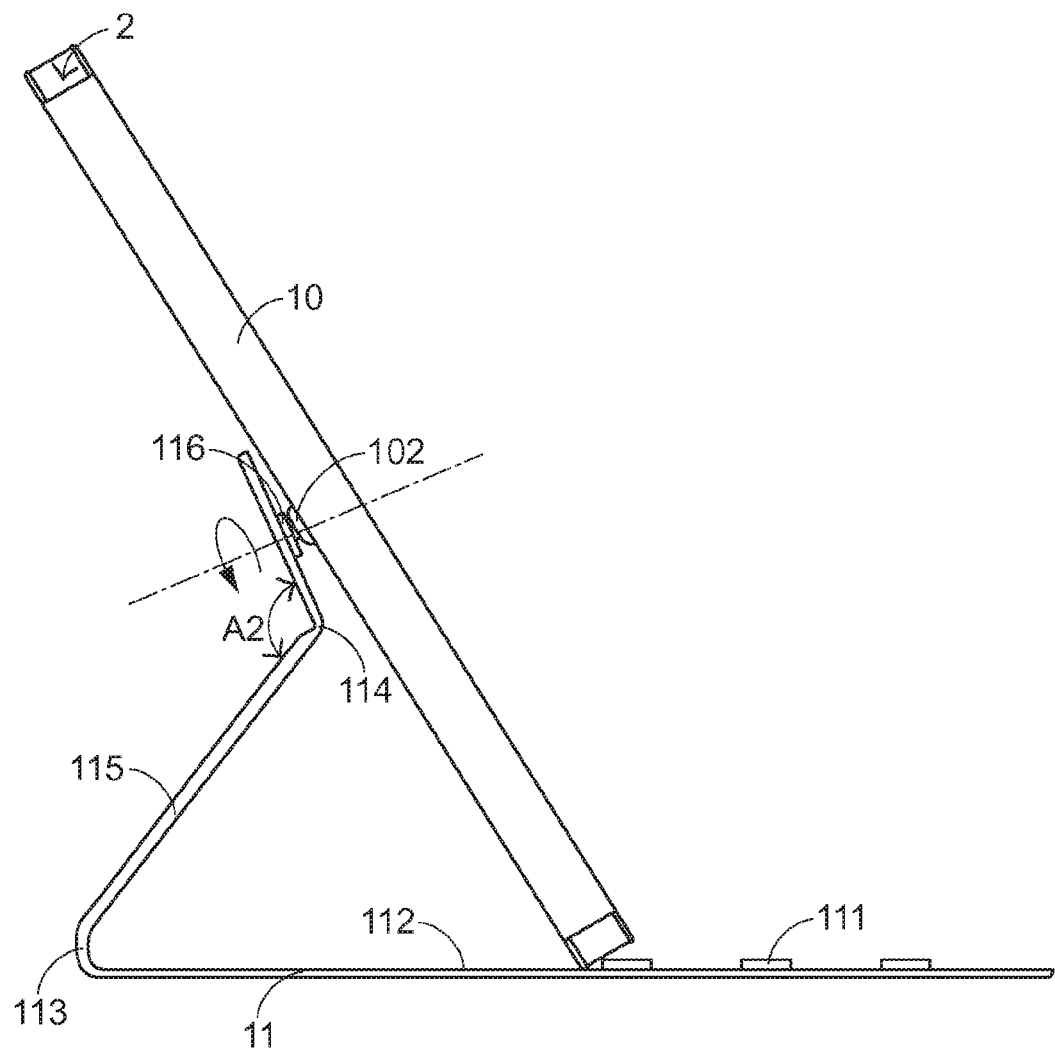
FIG. 5 is a schematic side view illustrating the conventional storing mechanism of FIG. 1 in an operating mode and in an upright-placement status.
Figure 6:
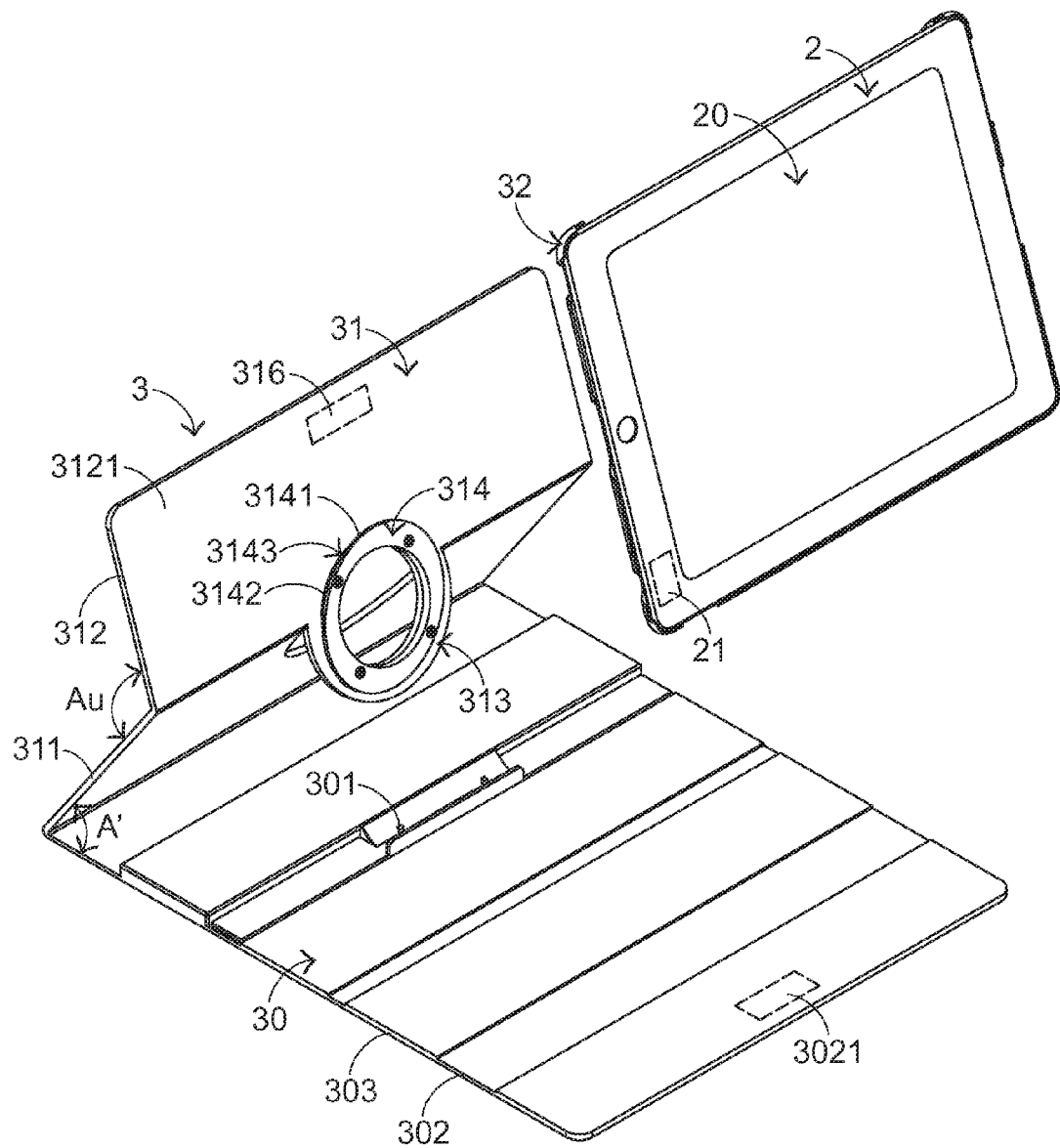
FIG. 6 is a schematic exploded view illustrating a storing mechanism for an electronic device according to a first embodiment of the present invention.
Figure 7:
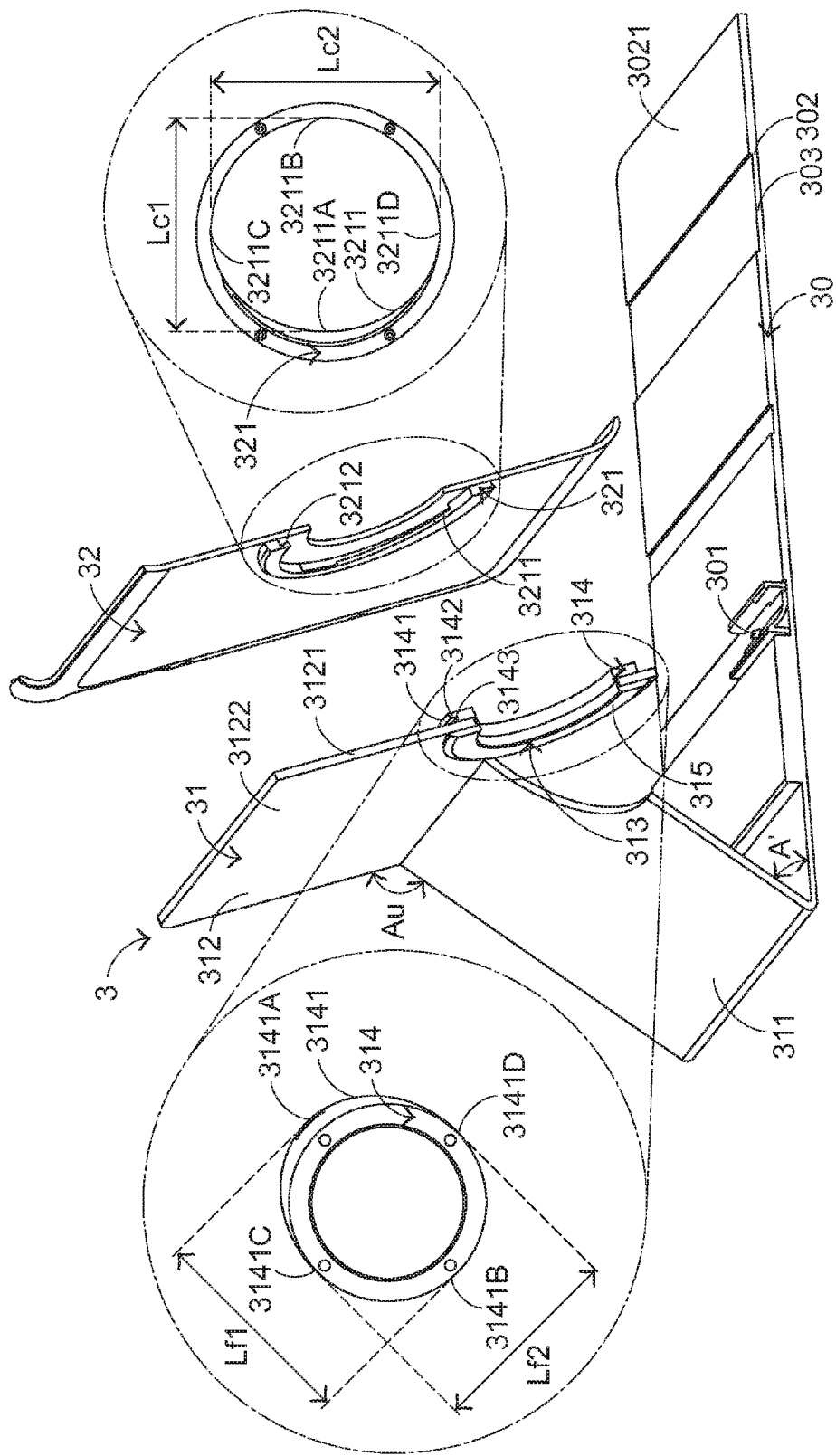
FIG. 7 is a schematic cutaway view illustrating the storing mechanism of FIG. 6.
Figure 9:
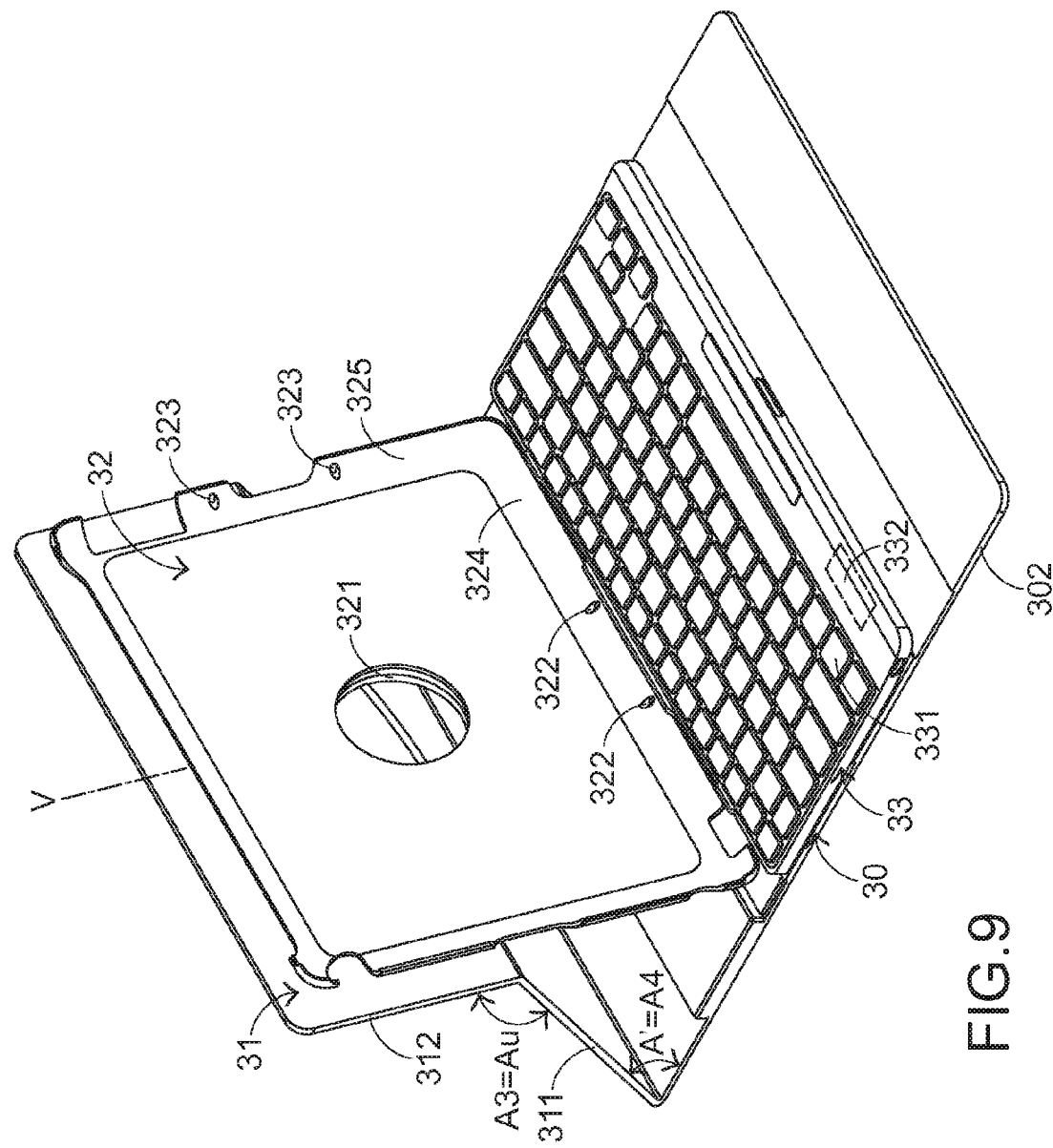
FIG. 9 is a schematic perspective view illustrating the storing mechanism according to the first embodiment of the present invention, in which the storing mechanism is in an operating mode and in a horizontal-placement status.

For obviating the drawbacks encountered from the prior art, the present invention provides a storing mechanism for an electronic device. FIG. 6 is a schematic exploded view illustrating a storing mechanism for an electronic device according to a first embodiment of the present invention. FIG. 7 is a schematic side view illustrating the storing mechanism of FIG. 6. In FIG. 6, a storing mechanism 3 and an electronic device 2 are shown. The configurations of the electronic device 2 are identical to those of the electronic device described in FIGS. 1~5. The electronic device 2 comprises a display screen 20 and a first wireless transmission module 21. In this embodiment, the electronic device 2 is a tablet computer, and the first wireless transmission module 21 is a Bluetooth transmission module. The storing mechanism 3 comprises a base member 30, an upper cover 31, and a protective cover 32. The protective cover 32 is used for covering a rear surface of the electronic device 2. In addition, the protective cover 32 comprises a connecting ring 321, at least one first opening 322 (for example two first openings 322 as shown in FIG. 9), and at least one second opening 323 (for example two second openings 323 as shown in FIG. 9). The first opening 322 is located at a first edge 324 of the protective cover 32. The second opening 323 is located at a second edge 325 of the protective cover 32.

Please refer to FIG. 6 again. The base member 30 comprises at least one fixing post 301 and a foldable structure 302. The at least one fixing post 301 is aligned with the at least one first opening 322 or the at least one second opening 323. The fixing post 301 is penetrated through the first opening 322 or the second opening 323, so that the first edge 324 or the second edge 325 of the protective cover 32 is fixed on the base member 30. The foldable structure 302 is located at a first side 303 of the base member 30. In addition, the foldable structure 302 comprises a first fixing element 3021, which is disposed within the foldable structure 302. The upper cover 31 is connected with the base member 30 and rotatable relative to the base member 30, so that the base member 30 is covered by the upper cover 31 or an included angle A' is defined between the upper cover 31 and the base member 30. The upper cover 31 comprises a first upper covering plate 311, a second upper covering plate 312, a fixing structure 313, and a second fixing element 316. The first upper covering plate 311 is connected with the base member 30, and rotatable relative to the base member 30. The second upper covering plate 312 is connected with the first upper covering plate 311, and bendable relative to the first upper covering plate 311. The fixing structure 313 is used for fixing the connecting ring 321 of the protective cover 32 on the upper cover 31. The fixing structure 313 is disposed on the second upper covering plate 312, and arranged at a junction between the first upper covering plate 311 and the second upper covering plate 312. Consequently, when the second upper covering plate 312 is bent relative to the first upper covering plate 311, an upper cover angle Au between the fixing structure 313 and the first upper covering plate 311 is changeable. The second fixing element 316 is disposed within the upper cover 31. After the base member 30 is covered by the upper cover 31, the second fixing element 316 is coupled with the first fixing element 3021. In this embodiment, the first upper covering plate 311 and the second upper covering plate 312 are integrally formed, the first fixing element 3021 is a metallic sheet, and the second fixing element 316 is a magnetic element. Alternatively, in some embodiments, the first fixing element is a magnetic element, and the second fixing element is a metallic sheet.

Please refer to FIG. 7. The fixing structure 313 comprises a first fixing ring 314 and a second fixing ring 315. The first fixing ring 314 is disposed on a first upper cover surface 3121 of the second upper covering plate 312. In addition, the first fixing ring 314 comprises an outer surface 3141, a first outer protrusion piece 3142, and a first recess 3143. The second fixing ring 315 is disposed on a second upper covering plate 3122 of the second upper covering plate 312 for fixing the first fixing ring 314 on the second upper covering plate 312. In this embodiment, the first fixing ring 314 and the second fixing ring 315 are fixed on the upper cover 31 by screwing means (see FIG. 6).

The outer surface 3141 of the first fixing ring 314 is disposed on an outer periphery of the first fixing ring 314. The first outer protrusion piece 3142 is disposed on the outer surface 3141, and located at a first end 3141A of the outer surface 3141. In addition, the first outer protrusion piece 3142 is extended from the first end 3141A of the outer surface 3141. The first recess 3143 is located at the outer surface 3141, and arranged between the first outer protrusion piece 3142 and the first upper cover surface 3121. After the connecting ring 321 is inserted into the first recess 3143, the connecting ring 321 and the first fixing ring 314 are engaged with each other. In this embodiment, the first fixing ring 314 has a first length Lf1 and a second length Lf2. The first outer protrusion piece 3142 is located at the first end 3141A of the outer surface 3141. The first length Lf1 of the first fixing ring 314 denotes a length from the first outer protrusion piece 3142 to a second end 3141B of the outer surface 3141. The second length Lf2 of the first fixing ring 314 denotes a length from a third end 3141C of the outer surface 3141 to a fourth end 3141D of the outer surface 3141. The first length Lf1 is greater than the second length Lf2.

On the other hand, the connecting ring 321 comprises an inner surface 3211 and a first inner protrusion piece 3212. The inner surface 3211 is disposed on an inner periphery of the connecting ring 321. The first inner protrusion piece 321 is disposed on the inner surface 3211 of the connecting ring 321, and located at a first end 3211A of the inner surface 3211. After the first inner protrusion piece 3212 is inserted into the first recess 3143, the connecting ring 321 and the first fixing ring 314 are engaged with each other. In this embodiment, the connecting ring 321 has a first length Lc1 and a second length Lc2. The first inner protrusion piece 3212 of the connecting ring 321 is located at the first end 3211A of the inner surface 3211. The first length Lc1 denotes a length from the first inner protrusion piece 3212 to a second end 3211B of the inner surface 3211. The second length Lc2 of the connecting ring 321 denotes a length from a third end 3211C of the inner surface 3211 to a fourth end 3211D of the inner surface 3211. The first length Lc1 is smaller than the second length Lc2. In addition, the first length Lf1 of the first fixing ring 314 is smaller than the first length Lc1 of the connecting ring 321, so that the fixing structure 313 is penetrable through the connecting ring 321.

Figure 8:
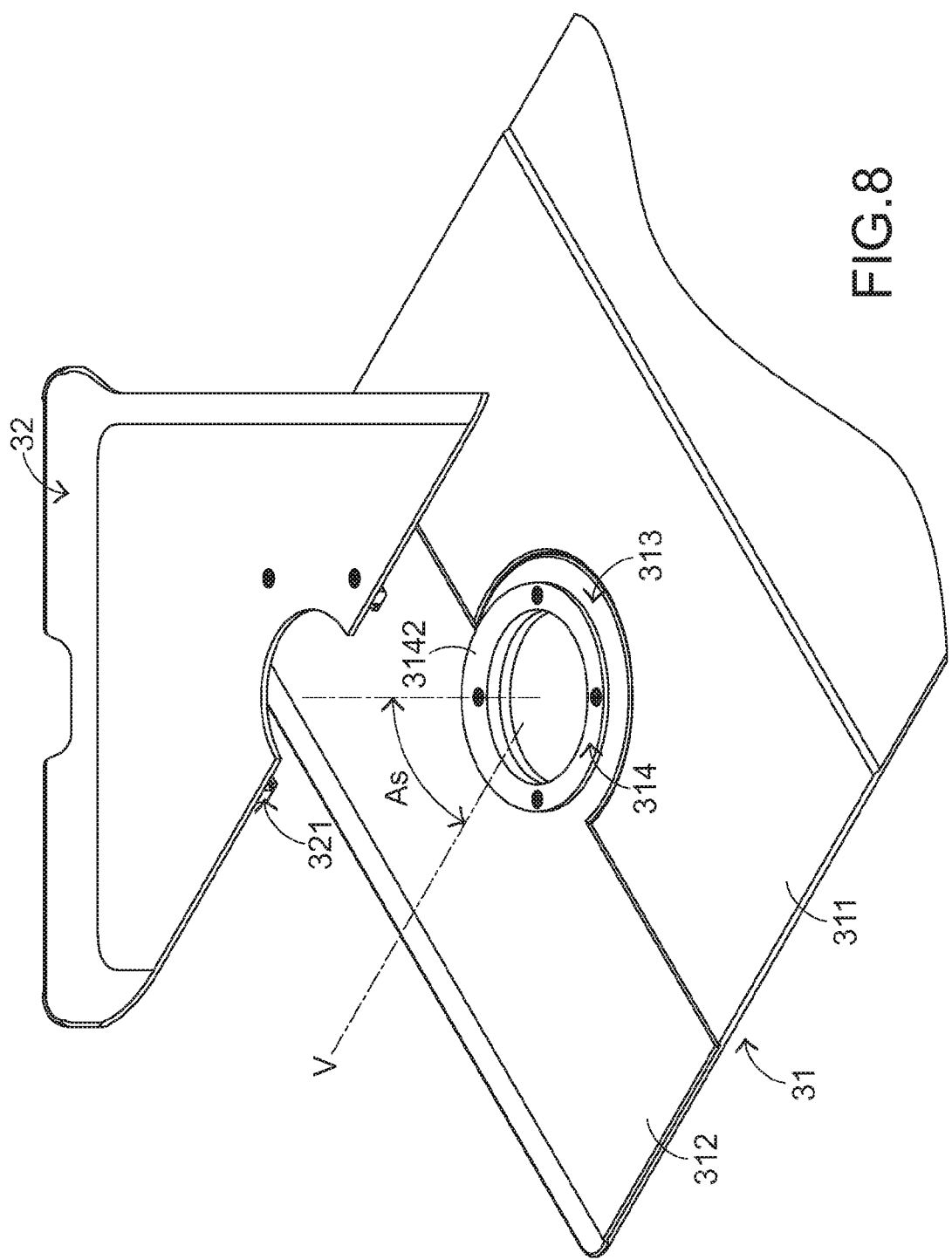
FIG. 8 is a schematic cutaway view illustrating a process of connecting the upper cover and the protective cover of the storing mechanism according to the first embodiment of the present invention.

FIG. 8 is a schematic cutaway view illustrating a process of connecting the upper cover and the protective cover of the storing mechanism according to the first embodiment of the present invention. As shown in FIG. 8, the fixing structure 313 is tilted relative to the upper cover 31. That is, the first outer protrusion piece 3142 of the fixing structure 313 is titled relative to a vertical line V of the upper cover 31 at a tilt angle As. In this embodiment, the tilt angle As is equal to 45 degrees. That is, if the user wants to fix the protective cover 32 on the upper cover 31, the protective cover 32 needs to be tilted by 45 degrees (see FIG. 8). Consequently, the fixing structure 313 can be penetrated through the connecting ring 321. After the fixing structure 313 is penetrated through the connecting ring 321, the protective cover 32 is rotated to have the first inner protrusion piece 3212 of the connecting ring 321 insert into the first recess 3143. In such way, the connecting ring 321 and the first fixing ring 314 are engaged with each other, and thus the protective cover 32 is fixed on the upper cover 31. Under this circumstance, the first inner protrusion piece 3212 of the connecting ring 321 is parallel with or vertical to the vertical line V of the upper cover 31.

Figure 10:
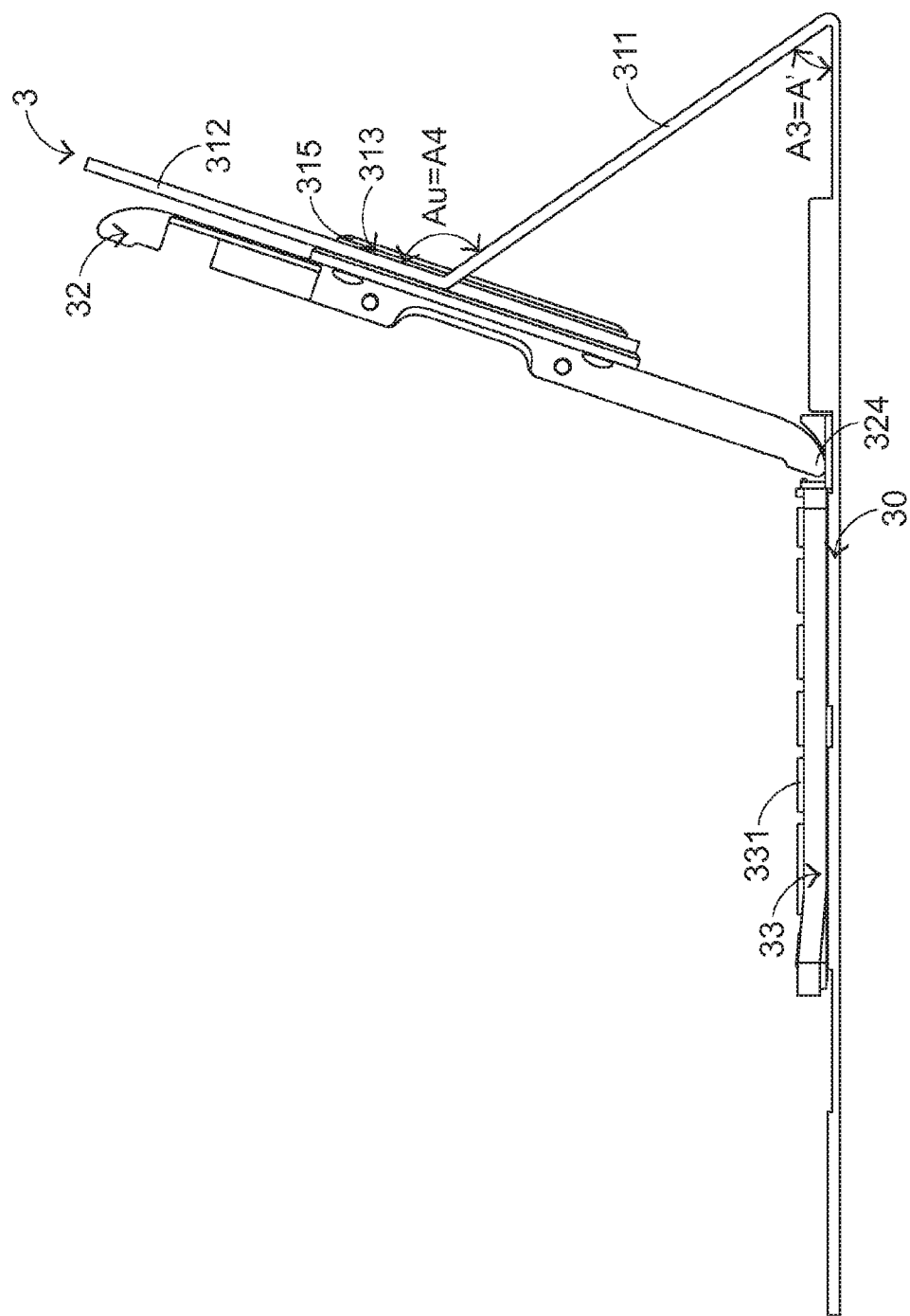
FIG. 10 is a schematic side view illustrating the storing mechanism of FIG. 9.

Please refer to FIGS. 9 and 10. FIG. 9 is a schematic perspective view illustrating the storing mechanism according to the first embodiment of the present invention, in which the storing mechanism is in an operating mode and in a horizontal-placement status. FIG. 10 is a schematic side view illustrating the storing mechanism of FIG. 9. As shown in FIG. 9, the storing mechanism 3 is in an operating mode and in a horizontal-placement status. Meanwhile, the first inner protrusion piece 3212 of the connecting ring 321 is vertical to the vertical line V of the upper cover 31 (not shown). In addition, the fixing post 301 is penetrated through the first opening 322, so that the first edge 324 of the protective cover 32 is fixed on the base member 30. Under this circumstance, the upper cover angle Au between the fixing structure 313 and the first upper covering plate 311 is equal to a third angle A3, and the included angle A' between the base member 30 and the first upper covering plate 311 is equal to a fourth angle A4.

In addition, a keyboard 33 is also shown in FIG. 9. The keyboard 33 comprises a plurality of keys 331 and a second wireless transmission module 332. These keys 331 are disposed on the keyboard 33, and exposed to the top surface of the keyboard 33. By depressing one or more keys 331 of the keyboard 33, the user may input characters, numbers, symbols or commands into the electronic device 2. The second wireless transmission module 332 is disposed within keyboard 33. When the second wireless transmission module 332 is in communication with the first wireless transmission module 21 of the electronic device 2 (not shown), the characters, numbers, symbols or commands may be transmitted from the second wireless transmission module 332 to the first wireless transmission module 21. In this embodiment, the second wireless transmission module 332 is also a Bluetooth transmission module.

In a case that the user wants to input characters, numbers, symbols or commands through the keyboard 33, the keyboard 33 is firstly placed on a desk surface. Meanwhile, the storing mechanism 3 may be also placed on the desk surface, and the electronic device 2 is supported by the storing mechanism 3.

Then, the first wireless transmission module 21 of the electronic device 2 is activated, so that the first wireless transmission module 21 is in communication with the second wireless transmission module 332. Under this circumstance, the user may operate the keyboard 33, and the characters, numbers, symbols or commands may be transmitted to the electronic device 2 through the first wireless transmission module 21 and the second wireless transmission module 332.

Figure 11:
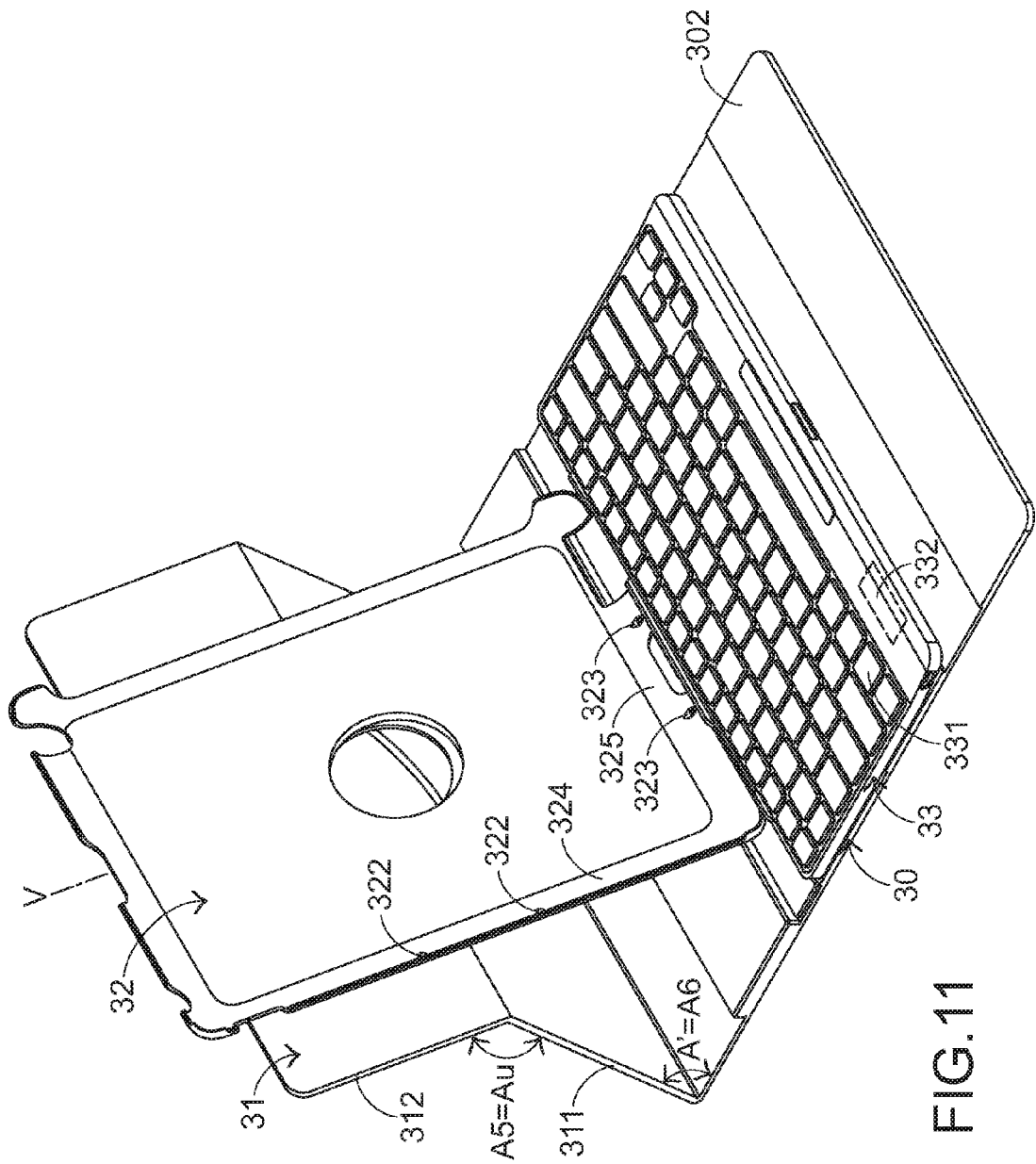
FIG. 11 is a schematic perspective view illustrating the storing mechanism according to the first embodiment of the present invention, in which the storing mechanism is in an operating mode and in an upright-placement status.
Figure 12:
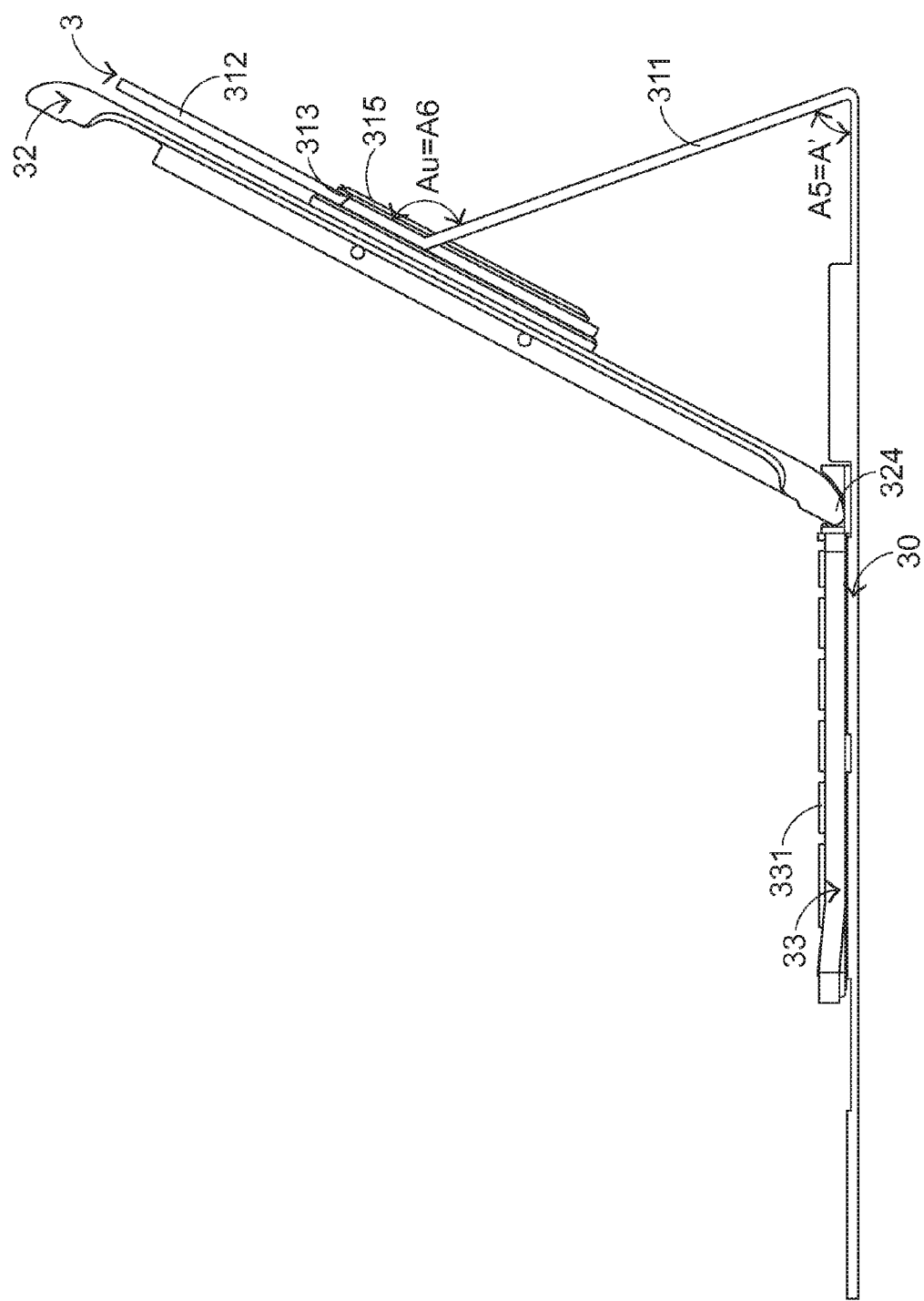
FIG. 12 is a schematic side view illustrating the storing mechanism of FIG. 11.

Then, by rotating the protective cover 32, the relationship between the first inner protrusion piece 3212 of the connecting ring 321 and the vertical line V of the upper cover 31 is switched from the vertical relationship to a horizontal relationship. Please refer to FIGS. 11 and 12. FIG. 11 is a schematic perspective view illustrating the storing mechanism according to the first embodiment of the present invention, in which the storing mechanism is in an operating mode and in an upright-placement status. FIG. 12 is a schematic side view illustrating the storing mechanism of FIG. 11. As shown in FIG. 10, the storing mechanism 3 is in an operating mode and in an upright-placement status. Meanwhile, the first inner protrusion piece 3212 of the connecting ring 321 is parallel with the vertical line V of the upper cover 31 (not shown). In addition, the fixing post 301 is penetrated through the second opening 323, so that the second edge 325 of the protective cover 32 is fixed on the base member 30. Under this circumstance, the upper cover angle Au between the fixing structure 313 and the first upper covering plate 311 is equal to a fifth angle A5, and the included angle A' between the base member 30 and the first upper covering plate 311 is equal to a sixth angle A6. Of course, when the storing mechanism 3 is in the operating mode and in the upright-placement status, the keyboard 33 may be in communication with the electronic device 2 (not shown) in order to transmit characters, numbers, symbols or commands to the electronic device 2.

Moreover, the fixing structure 313 is disposed on the second upper covering plate 312 and arranged at the junction between the first upper covering plate 311 and the second upper covering plate 312. Consequently, when the second upper covering plate 312 is bent relative to the first upper covering plate 311, the upper cover angle Au between the fixing structure 313 and the first upper covering plate 311 is changeable. In such way, the fixing structure 313 of the second upper covering plate 312 can be continuously parallel with the protective cover 32. Since the engagement between the fixing structure 313 and the connecting ring 321 is very stable, the possibility of detaching the protective cover 32 from the upper cover 31 will be minimized. On the other hand, the fixing structure 313 and the connecting ring 321 are combined together by rotating and engaging means. The combination of the fixing structure 313 and the connecting ring 321 can provide a stable bonding force to the protective cover 32 and the upper cover 31 to facilitate combination between the protective cover 32 and the upper cover 31. In a case that the user wants to remove the protective cover 32 from the upper cover 31, the user may simply rotate the protective cover 32 to have the first inner protrusion piece 3212 of the connecting ring 321 align with the first outer protrusion piece 3142. Meanwhile, the fixing structure 313 is tilted relative to the upper cover 31 to have a tilt angle as shown in FIG. 8. Then, the fixing structure 313 and the connecting ring 321 are separated from each other, and the protective cover 32 is removed.

Figure 13:
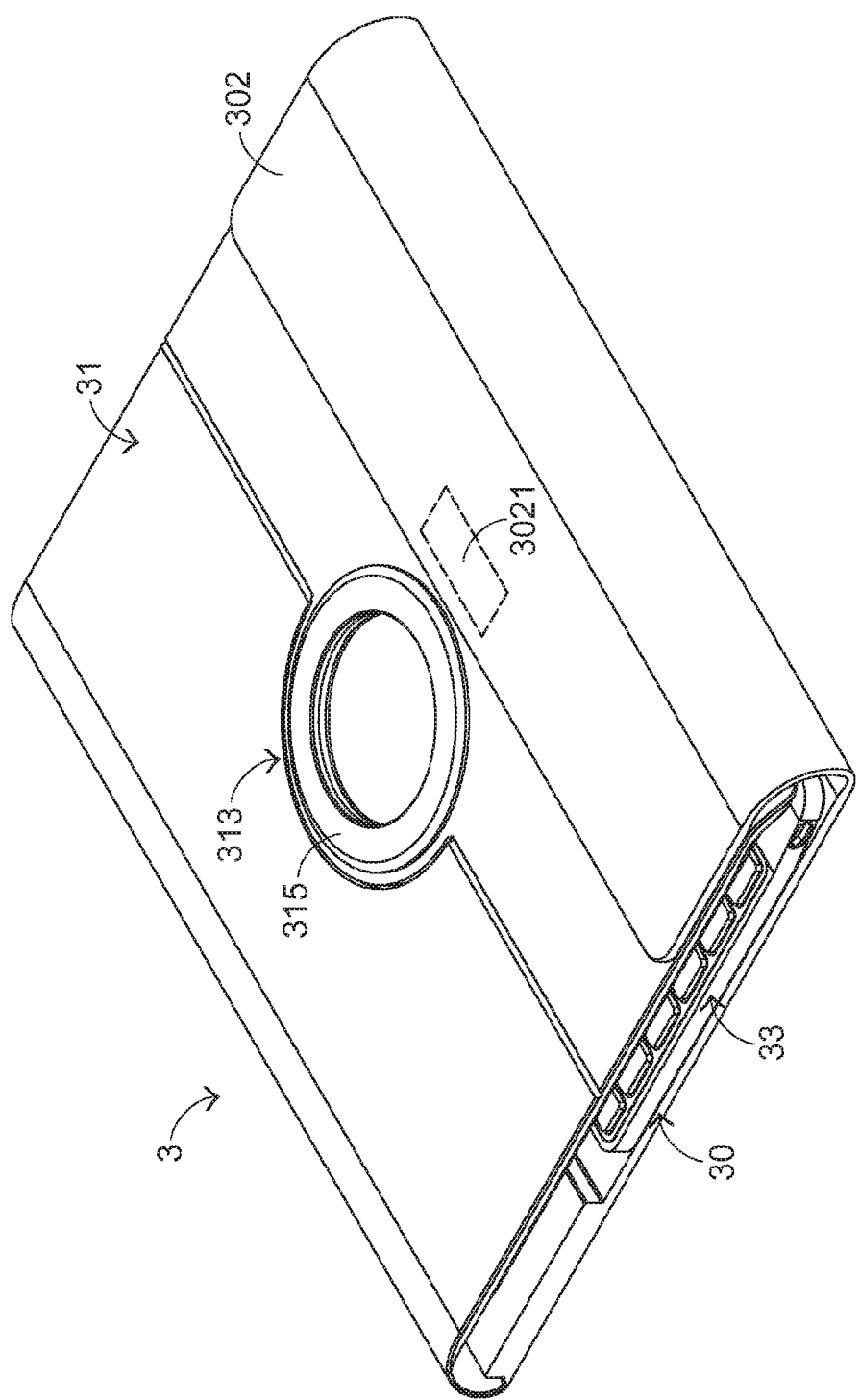
FIG. 13 is a schematic perspective view illustrating the storing mechanism according to the first embodiment of the present invention, in which the storing mechanism in a storing mode.

FIG. 13 is a schematic perspective view illustrating the storing mechanism according to the first embodiment of the present invention, in which the storing mechanism in a storing mode. After the electronic device 2 has been used and the electronic device 2 and the keyboard 33 need to be stored, the user may rotate the protective cover 32, so that the first inner protrusion piece 3212 of the connecting ring 321 is vertical to the vertical line V of the upper cover 31. Then, the keyboard 33 is placed on the base member 30. Then, the upper cover 31 is rotated to cover the base member 30, so that the electronic device 2 (not shown) and the keyboard 33 are accommodated within the storing mechanism 3. Then, the foldable structure 302 is folded to cover the upper cover 31. At the same time, the first fixing element 3021 of the foldable structure 302 and the second fixing element 316 of the upper cover 31 are magnetically coupled with each other. Under this circumstance, the storing mechanism 3 is shaped as a notebook (see FIG. 13). Due to the notebook appearance, the storing mechanism 3 can be easily carried by the user.

Figure 14:
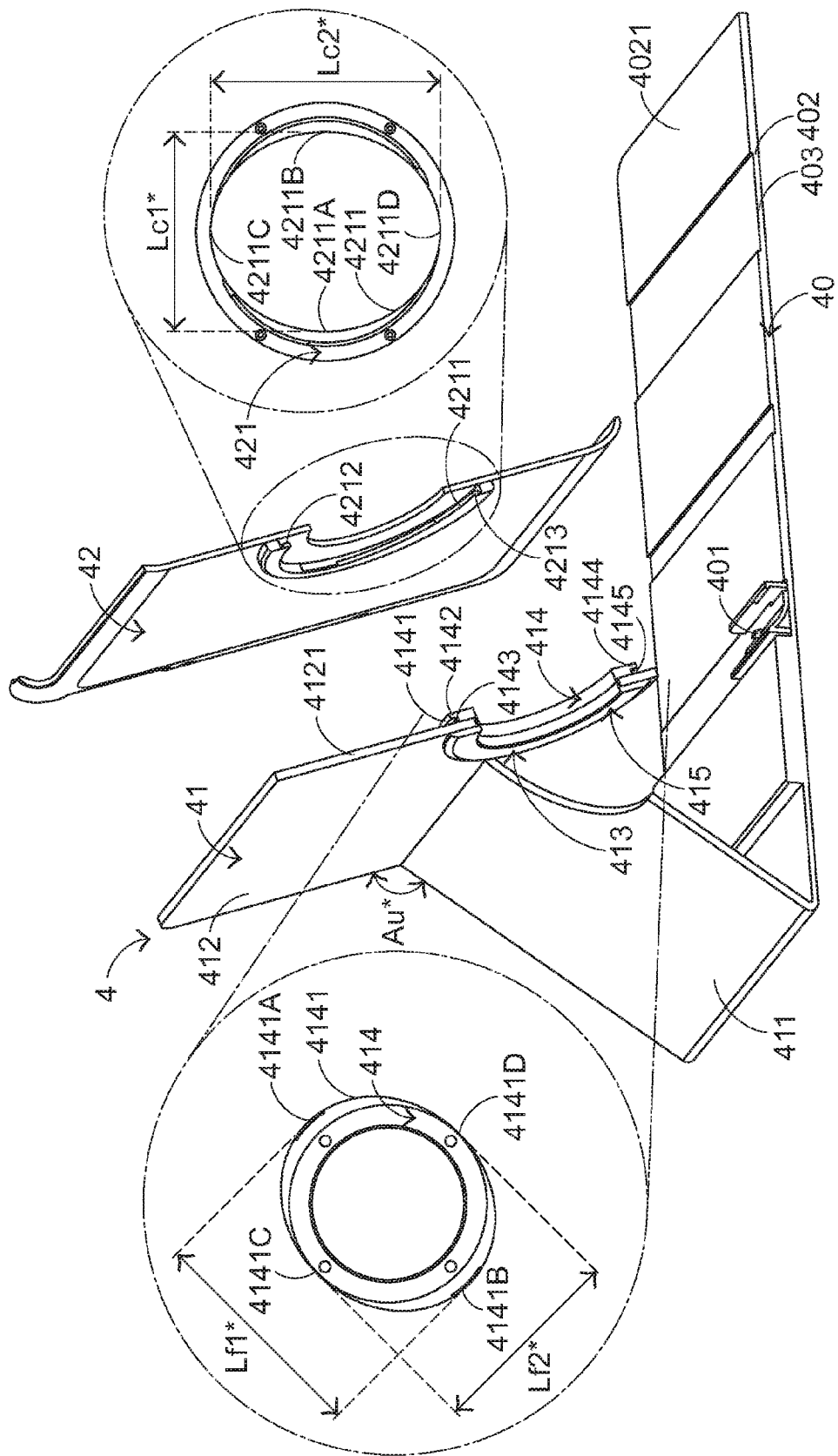
FIG. 14 is a schematic cutaway view illustrating a storing mechanism for an electronic device according to a second embodiment of the present invention.

The present invention further provides a storing mechanism for an electronic device according to a second embodiment of the present invention. FIG. 14 is a schematic cutaway view illustrating a storing mechanism for an electronic device according to a second embodiment of the present invention. The storing mechanism 4 comprises a base member 40, an upper cover 41, and a protective cover 42. The protective cover 42 comprises a connecting ring 421. The base member 40 comprises at least one fixing post 401 and a foldable structure 402. The upper cover 41 comprises a first upper covering plate 411, a second upper covering plate 412, and a fixing structure 413. Except for the fixing structure 413 and the connecting ring 421, the configurations of the storing mechanism 4 of this embodiment are substantially identical to those of the storing mechanism 3 of the first embodiment. As shown in FIG. 14, the fixing structure 413 comprises a first fixing ring 414 and a second fixing ring 415. The first fixing ring 414 is disposed on a first upper cover surface 4121 of the second upper covering plate 412. In addition, the first fixing ring 414 comprises an outer surface 4141, a first outer protrusion piece 4142, a first recess 4143, a second outer protrusion piece 4144, and a second recess 4145. The configurations of the second fixing ring 415 are similar to those of the second fixing ring 315 of the first embodiment, and are not redundantly described herein.

The outer surface 4141 of the first fixing ring 414 is disposed on an outer periphery of the first fixing ring 414. The first outer protrusion piece 4142 is disposed on the outer surface 4141, and extended from the outer surface 4141. The first recess 4143 is located at the outer surface 4141, and arranged between the first outer protrusion piece 4142 and the first upper cover surface 4121. After the connecting ring 421 is inserted into the first recess 4143, the connecting ring 421 and the first fixing ring 414 are engaged with each other. Similarly, the second outer protrusion piece 4144 is disposed on the outer surface 4141, and extended from the outer surface 4141. The second recess 4145 is located at the outer surface 4141, and arranged between the second outer protrusion piece 4144 and the first upper cover surface 4121. After the connecting ring 421 is inserted into the second recess 4145, the connecting ring 421 and the first fixing ring 414 are engaged with each other.

In this embodiment, the first fixing ring 414 has a first length Lf1* and a second length Lf2*. The first outer protrusion piece 4142 is located at a first end 4141A of the outer surface 4141, and the second outer protrusion piece 4144 is located at a second end 4141B of the outer surface 4141. The first length Lf1* of the first fixing ring 414 denotes a length from the first outer protrusion piece 4142 to the second outer protrusion piece 4144. The second length Lf2* of the first fixing ring 414 denotes a length from a third end 4141C of the outer surface 4141 to a fourth end 4141D of the outer surface 4141. The first length Lf1* is greater than the second length Lf2*.

On the other hand, the connecting ring 421 comprises an inner surface 4211, a first inner protrusion piece 4212, and a second inner protrusion piece 4213. The inner surface 4211 is disposed on an inner periphery of the connecting ring 421. The first inner protrusion piece 421 is disposed on the inner surface 4211 of the connecting ring 421. The second inner protrusion piece 4213 is also disposed on the inner surface 4211 of the connecting ring 421. After the first inner protrusion piece 4212 and the second inner protrusion piece 4213 are respectively inserted into the first recess 4143 and the second recess 4145, the connecting ring 421 and the first fixing ring 414 are engaged with each other. In this embodiment, the connecting ring 421 has a first length Lc1* and a second length Lc2*. The first inner protrusion piece 4212 of the connecting ring 421 is located at a first end 4211A of the inner surface 4211, and the second inner protrusion piece 4213 is located at a second end 4211B of the inner surface 4211. The first length Lc1* denotes a length from the first inner protrusion piece 4212 to the second inner protrusion piece 4213. The second length Lc2* of the connecting ring 421 denotes a length from a third end 4211C of the inner surface 4211 to a fourth end 4211D of the inner surface 4211. The first length Lc1* is smaller than the second length Lc2*. In addition, the first length Lf1* of the first fixing ring 414 is smaller than the first length Lc1* of the connecting ring 421, so that the fixing structure 413 is penetrable through the connecting ring 421. The outer surface 4141 of the first fixing ring 414 has an elliptic contour. Correspondingly, the inner surface 4211 of the connecting ring 421 also has an elliptic contour. As a consequence, the protective cover 42 and the upper cover 41 of the storing mechanism 4 can be securely combined together.

From the above description, the shape of the storing mechanism for an electronic device according to the present invention may be changed by the user according to the practical requirements. When the user wants to operate the electronic device, the electronic device may be fixed on the storing mechanism and the keyboard device may be stored within the storing mechanism. In this situation, the user may operate the electronic device according to the usual practice. On the other hand, when the user wants to simultaneously carry the electronic device and the keyboard, the electronic device and the keyboard device may be stored within the storing mechanism and the storing mechanism is shaped as a notebook. Due to the slim notebook appearance, the storing mechanism can be easily carried by the user. In other words, the storage device of the present invention is capable of supporting the electronic device and storing the electronic device therein. Moreover, the storing mechanism of the present invention is capable of storing the keyboard. On the other hand, for fixing the protective cover on the upper cover, the fixing structure and the connecting ring are combined together by rotating and engaging means. Moreover, since the fixing structure is arranged at the junction between the first upper covering plate and the second upper covering plate, the combination between the fixing structure and the protective cover is not adversely affected by the action of rotating or bending the upper cover. In other words, the combination between the protective cover and the upper cover is more stable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A storing mechanism for an electronic device, said storing mechanism comprising:
a protective cover for covering a rear surface of said electronic device, wherein said protective cover comprises a connecting ring;
a base member; and
an upper cover connected with said base member and rotatable relative to said base member, so that said base member is covered by said upper cover or an included angle is defined between said upper cover and said base member, wherein said upper cover comprises:
a first upper covering plate connected with said base member and rotatable relative to said base member;
a second upper covering plate connected with said first upper covering plate and bendable relative to said first upper covering plate; and
a fixing structure for fixing said connecting ring on said upper cover, wherein said fixing structure is disposed on the second upper covering plate and arranged at a junction between said first upper covering plate and said second upper covering plate, so that an upper cover angle between said fixing structure and said first upper covering plate is changeable when said second upper covering plate is bent relative to said first upper covering plate, wherein said fixing structure comprises:
a first fixing ring disposed on an upper cover surface of said second upper covering plate, and comprising an outer surface, a first outer protrusion piece, and a first recess, wherein said outer surface is disposed on an outer periphery of said first fixing ring, said first outer protrusion piece is disposed on said outer surface, and said first recess is located at said outer surface and arranged between said first outer protrusion piece and said upper cover surface, wherein after said connecting ring is inserted into said first recess, said connecting ring and said first fixing ring are engaged with each other; and
a second fixing ring disposed on another upper cover surface of said second upper covering plate for fixing said first fixing ring on said second upper covering plate.

2. The storing mechanism according to claim 1, wherein said first outer protrusion piece is located at a first end of said outer surface, wherein a first length of said first fixing ring from said first outer protrusion piece to a second end of said outer surface is greater than a second length of said first fixing ring from a third end of said outer surface to a fourth end of said outer surface, wherein said first length of said first fixing ring is smaller than a length of said connecting ring, so that said fixing structure is penetrable through said connecting ring.

3. The storing mechanism according to claim 1, wherein said first fixing ring further comprises:
a second outer protrusion piece disposed on said outer surface of said fixing structure and located at a second end of said outer surface; and
a second recess located at said outer surface and arranged between said second outer protrusion piece and said upper cover surface, wherein after said connecting ring is inserted into said second recess, said connecting ring and said first fixing ring are engaged with each other.

4. The storing mechanism according to claim 3, wherein a first length of said first fixing ring from said first outer protrusion piece to said second outer protrusion piece is greater than a second length of said first fixing ring from a third end of said outer surface to a fourth end of said outer surface, wherein said outer surface has an elliptic contour.

5. The storing mechanism according to claim 1, wherein said connecting ring comprises:
an inner surface disposed on an inner periphery of said connecting ring; and
a first inner protrusion piece disposed on said inner surface of said connecting ring, wherein after said first inner protrusion piece is inserted into said first recess, said fixing structure and said first fixing ring are engaged with each other.

6. The storing mechanism according to claim 5, wherein said first inner protrusion piece is located at a first end of said inner surface, wherein a first length of said connecting ring from said first inner protrusion piece to a second end of said inner surface is smaller than a second length of said connecting ring from a third end of said inner surface to a fourth end of said inner surface.

7. The storing mechanism according to claim 5, wherein said connecting ring further comprises a second inner protrusion piece, wherein said second inner protrusion piece is disposed on said inner surface of said connecting ring, and located at a second end of said inner surface, wherein after said second inner protrusion piece is inserted into said second recess, said fixing structure and said first fixing ring are engaged with each other.

8. The storing mechanism according to claim 7, wherein a first length of said connecting ring from said first inner protrusion piece to said second inner protrusion piece is smaller than a second length of said connecting ring from a third end of said inner surface to a fourth end of said inner surface, wherein said inner surface has an elliptic contour.

9. The storing mechanism according to claim 1, wherein said base member further comprises a foldable structure, which is located at a first side of said base member, wherein after said base member is covered by said upper cover, said foldable structure is folded to cover said upper cover, wherein a first fixing element is disposed within said foldable structure, and a second fixing element is disposed within said upper cover, wherein after said base member is covered by said upper cover, said first fixing element and said second fixing element are coupled with each other.

10. The storing mechanism according to claim 9, wherein said first fixing element is a metallic sheet, and said second fixing element is a magnetic element.

11. The storing mechanism according to claim 9, wherein said first fixing element is a magnetic element, and said second fixing element is a metallic sheet.

12. A storing mechanism for an electronic device, said storing mechanism comprising:
a protective cover for covering a rear surface of said electronic device, wherein said protective cover comprises a connecting ring;
a base member; and
an upper cover connected with said base member and rotatable relative to said base member, so that said base member is covered by said upper cover or an included angle is defined between said upper cover and said base member, wherein said upper cover comprises:
a first upper covering plate connected with said base member and rotatable relative to said base member;
a second upper covering plate connected with said first upper covering plate and bendable relative to said first upper covering plate; and
a fixing structure for fixing said connecting ring on said upper cover, wherein said fixing structure is disposed on the second upper covering plate and arranged at a junction between said first upper covering plate and said second upper covering plate, so that an upper cover angle between said fixing structure and said first upper covering plate is changeable when said second upper covering plate is bent relative to said first upper covering plate,
wherein said protective cover further comprises a first opening and a second opening, wherein said first opening is located at a first edge of said protective cover, and said second opening is located at a second edge of said protective cover, wherein said base member further comprises a fixing post, and said fixing post is penetrated through said first opening or said second opening, so that said first edge or said second edge of said protective cover is fixed on said base member.

13. The storing mechanism according to claim 12, wherein when said first edge of said protective cover is fixed on said base member, said included angle between said upper cover and said base member is equal to a first angle, wherein when said second edge of said protective cover is fixed on said base member, said included angle between said upper cover and said base member is equal to a second angle, wherein said first angle is smaller than said second angle.

14. The storing mechanism according to claim 12, wherein said base member further comprises a foldable structure, which is located at a first side of said base member, wherein after said base member is covered by said upper cover, said foldable structure is folded to cover said upper cover, wherein a first fixing element is disposed within said foldable structure, and a second fixing element is disposed within said upper cover, wherein after said base member is covered by said upper cover, said first fixing element and said second fixing element are coupled with each other.

15. The storing mechanism according to claim 14, wherein said first fixing element is a metallic sheet, and said second fixing element is a magnetic element.

16. The storing mechanism according to claim 14, wherein said first fixing element is a magnetic element, and said second fixing element is a metallic sheet.

* * * * *